United States Patent
Lutzka et al.

(10) Patent No.: US 7,434,862 B2
(45) Date of Patent: Oct. 14, 2008

(54) COMBINATION FRONT AND REAR FLOOR LATCH ASSEMBLY FOR SELECTIVE FORWARD TUMBLING AND REMOVAL OF A REAR ROW VEHICLE SEAT

(75) Inventors: Tavis Lutzka, Clawson, MI (US); Stephen Bruck, Howell, MI (US); Keith Brantley, Utica, MI (US)

(73) Assignee: BAE Industries, Inc., Centerline, MI (US)

( * ) Notice: Subject to any disclaimer, the term of this patent is extended or adjusted under 35 U.S.C. 154(b) by 72 days.

(21) Appl. No.: 11/247,638

(22) Filed: Oct. 11, 2005

(65) Prior Publication Data

US 2007/0080555 A1    Apr. 12, 2007

(51) Int. Cl.
*B60N 2/04* (2006.01)
(52) U.S. Cl. .................. 296/65.03; 248/503.1; 297/336
(58) Field of Classification Search .............. 296/65.05, 296/65.09, 65.08, 65.03; 297/331, 332, 333, 297/334, 335, 336; 248/503.1
See application file for complete search history.

(56) References Cited

U.S. PATENT DOCUMENTS

| 3,889,464 A | 6/1975 | Gardner |
| 4,629,252 A | 12/1986 | Myers et al. |
| 4,759,580 A | 7/1988 | Berklich, Jr. |
| 5,372,398 A | 12/1994 | Aneiros et al. |
| 5,547,242 A | 8/1996 | Dukatz |
| 6,039,401 A | 3/2000 | Rus |
| 6,053,555 A | 4/2000 | Neale |
| 6,056,346 A | 5/2000 | Smuk |
| 6,161,890 A | 12/2000 | Pesta et al. |
| 6,164,712 A | 12/2000 | Ajisaka et al. |
| 6,196,611 B1 | 3/2001 | Lee |
| 6,213,525 B1 | 4/2001 | Nicola |
| 6,361,098 B1 | 3/2002 | Pesta et al. |
| 6,698,837 B2 * | 3/2004 | Pejathaya et al. ...... 297/378.12 |
| 6,749,264 B2 | 6/2004 | Jeong |
| 6,820,912 B1 | 11/2004 | Lavoie |
| 6,910,739 B2 | 6/2005 | Grable et al. |

(Continued)

*Primary Examiner*—Dennis H. Pedder
*Assistant Examiner*—Melissa A Black
(74) *Attorney, Agent, or Firm*—Gifford, Krass, Sprinkle, Anderson & Citkowski, P.C.

(57) ABSTRACT

A multifunctional latch assembly associated with a rear row mounted and removable vehicle seat exhibiting a seat back pivotally secured to a seat bottom. The latch assembly releasably engages the seat bottom to front and rear floor supported strikers and to permit forward rotating seat dump and/or rearward seat removal. A first latch mechanism is mounted to a rear location of a frame associated with the seat bottom and includes a latch plate configured to engage the rear striker. A release lever is secured to a further location of the seat frame and is actuated a degree to permit the seat back to pivotally fold flat against the seat bottom, the release lever is further actuated a second degree to disengage the latch plate from the rear located striker and to permit forward rotation of the seat about the front supported striker. A second latch mechanism is mounted to a selected front location of the seat frame and includes an arcuately configured latch engaging the front striker. The second latch mechanism further includes a spring actuated hook engaging a lockout pin pivotally associated with the arcuately configured latch, upon a selected pivotal displacement of the seat frame relative the front floor supported striker, the seat subsequently being rearwardly displaced to permit removal from the vehicle.

35 Claims, 13 Drawing Sheets

U.S. PATENT DOCUMENTS 7,198,316 B2 4/2007 Lutzka et al.
7,222,907 B2 5/2007 Lutzka et al.

2005/0099047 A1 5/2005 Elterman et

* cited by examiner

COMBINATION FRONT AND REAR FLOOR LATCH ASSEMBLY FOR SELECTIVE FORWARD TUMBLING AND REMOVAL OF A REAR ROW VEHICLE SEAT

BACKGROUND OF THE INVENTION

1. Field of the Invention

The present invention relates generally to floor latch assemblies associated with pivoting or removable vehicle seats. More specifically, the present invention teaches combination front and rear latch assemblies associated with a rear row vehicle seat and which provide the above combined features of locked forward tumble and rearward removal.

2. Description of the Prior Art

The prior art is well documented with examples of floor latch and dump assemblies associated with a vehicle seat. Many of these seat designs are concerned with the ability to fold and/or remove such as a rear row vehicle seat.

Rus, U.S. Pat. No. 6,039,401, teaches a latch mechanism which removably attaches a front portion of a collapsible and removable utility seat assembly to a latch rod on a vehicle floor pan. The latch mechanism includes a bracket adapted for attachment to the front portion of the utility seat assembly with a wheel attached thereto. The latch mechanism includes a locking mechanism connected to the bracket. The locking mechanism includes a lock member rotatably connected to the bracket and adapted for engagement with the floor pan for causing rotation of the lock member with respect to the bracket to facilitate locking of the locking mechanism onto the latch rod as the utility seat assembly is collapsed.

Jeong, U.S. Pat. No. 6,749,264, teaches a detachable seat for a vehicle including a seat bracket at the bottom thereof, and which is detachably coupled with guide grooves and front and rear strikers formed in a floor panel of the vehicle. The bracket comprises a body unit including a bracket body with front engaging grooves and rear engaging grooves for floor mounted strikers. Locking units are provided for releasing the rear striker from the rear engaging grooves in response to control of a release lever; and rollers are located to facilitate mounting and demounting of the seat.

Nicola, U.S. Pat. No. 6,213,525, teaches a lever action floor latch actuation mechanism for removably securing a seat to a pair of front and rear strikers on the floor of a vehicle. Front and rear latches are pivotally connected to the forward and rearward legs, respectively, for releasably securing the seat to the strikers. Of note, a longitudinally extending linkage pivotally interconnects the front and rear latches and an actuation member coupled to the link simultaneously moves the latches between a latched position engaging the strikers and an unlatched position disengaging the strikers.

Finally, U.S. Pat. No. 6,053,555, issued to Neale, teaches an automotive seat assembly removable from a vehicle. Of note, a first latch assembly selectively secures the upper portion of the seat back frame to an upper interior region of the vehicle. A second latch assembly selectively secures the seat cushion to the vehicle when the seat cushion assembly is pivoted to the occupant seating condition. A retaining member is mounted on opposite interior side walls of the vehicle and is positioned to receive each of a pair of anchor pins located at ends of a crosswise extending structural member associated with the seat back frame, and upon the seat back assembly being pivoted about rollers associated with a lower portion of the seat back frame. Upon the anchor pins being fully registered within the retaining member, the first and second latch assemblies are aligned for respective interengagement and the structural member operably engages the vehicle for transferring the seat belt forces thereto.

SUMMARY OF THE PRESENT INVENTION

The present invention discloses a rear row mounted and removable vehicle seat exhibiting a multifunctional latch assembly, and for permitting forward rotating seat dump of a seat back pivotally secured to a seat bottom, in turn pivotally supported in releasably engageable fashion upon a plurality of floor mounted strikers. The present invention further makes possible rearward displacing removal of the seat, such as from a rear hatchback or door associated with the rear row seat.

The latch assembly includes a first pair of latch subassemblies mounted to selected rear locations of a seat bottom frame, each including a latch plate adapted to engage a corresponding rear striker. A release lever is secured to a further location of the seat frame and actuated a degree to permit the seat back to pivotally fold flat against the seat bottom. The release lever is subsequently being actuated a second degree to disengage the latch plate from the rear located striker, through at least one linearly translatable cable extending to the rear latch assemblies, and to permit forward rotation of the seat about the front supported striker.

A second pair of latch subassemblies are mounted to selected forward locations of the seat bottom frame and each includes an arcuately configured latch adapted to engage a corresponding front striker. The second latch mechanism further includes a spring actuated hook for engaging a lockout pin pivotally associated with the arcuately configured latch upon a selected pivotal displacement of said seat frame relative the front floor supported striker.

At least one further cable extends from the release lever to a linkage associated with the spring actuated lockout engaging hook, and can be actuated through a selected degree of rotation of the release lever to set the hook in an engagement or pre-engagement position relative to the lockout pin. This occurs such as during cooperating actuation of an over-center spring associated with the linkage actuating structure, and during such as a selected degree of pivotal displacement of the seat bottom in up and down fashion and to selected angular orientations following rear latch release in order to facilitate rearward removal.

BRIEF DESCRIPTION OF THE DRAWINGS

Reference will now be made to the attached drawings, when read in combination with the following detailed description, wherein like reference numerals refer to like parts throughout the several claims, and in which:

DETAILED DESCRIPTION OF THE PREFERRED EMBODIMENTS

Figure 1:
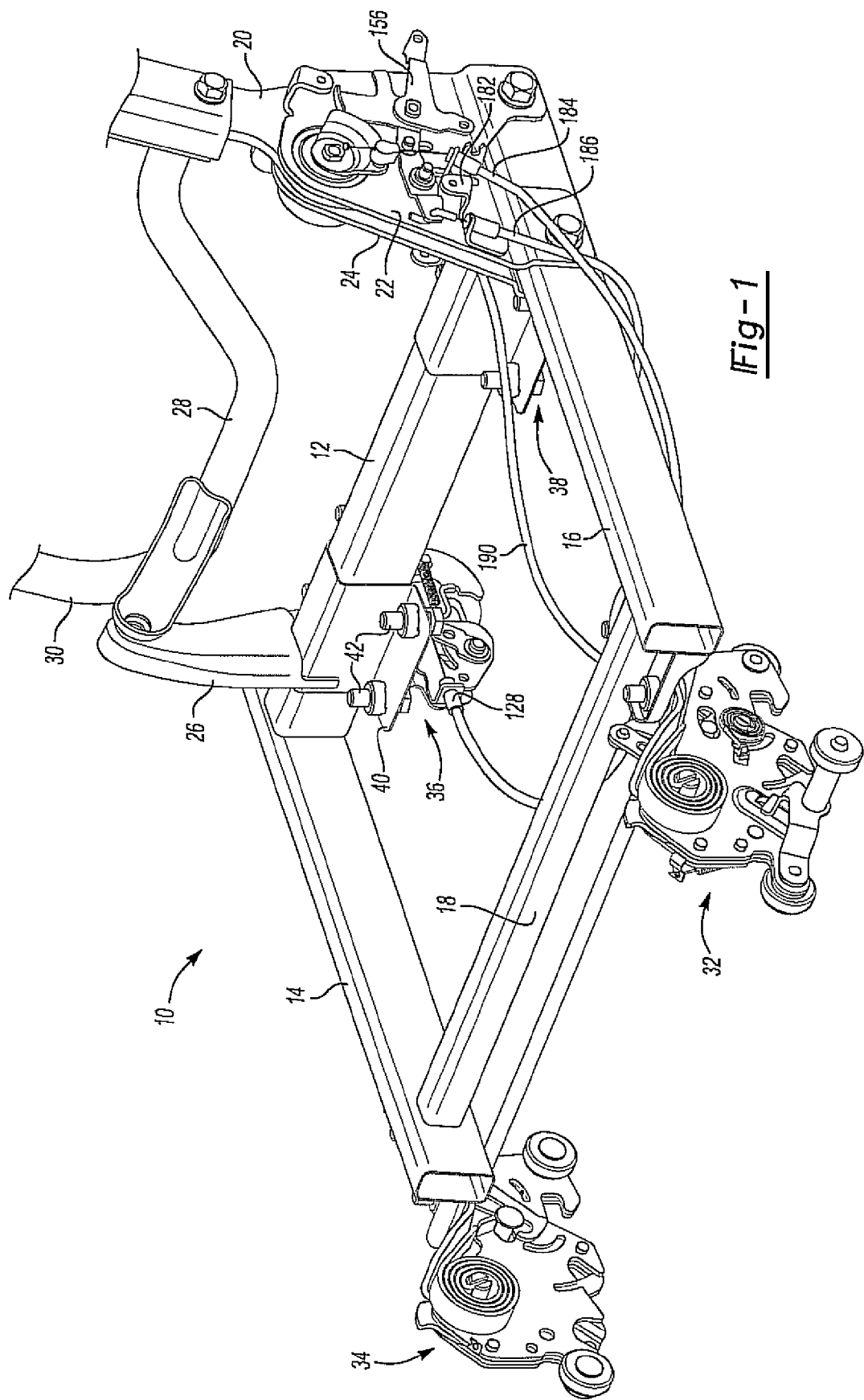
FIG. 1 is an environmental perspective of a rear row mounted seat frame exhibiting a seat back pivotally associated with a seat bottom mounted to a floor of a vehicle, and exhibiting pairs of front and rear latch assemblies engaging proximately located floor supported strikers.

With reference now to FIG. 1, an environmental perspective illustration is shown at 10 of a multifunctional latch assembly associated with a rear row mounted seat according to the present invention. As previously described, the present assembly facilitates forward rotating seat dump of the seat, as well as permitting rearward removal of the seat.

The seat includes a frame defining a seat back pivotally secured relative to a seat bottom. The seat bottom is generally defined by four generally tubular shaped and interconnecting portions, see rear portion 12, opposing sides 14 and 16, and interconnecting front portion 18.

The seat back is again pivotally associated with the seat bottom, such as along its rearward extending portion 12, and includes a seatback arm 20 (see also FIG. 20) pivotally secured between a pair of support plates 22 and 24 in turn secured to a rear corner location of the seat bottom (see portions 12 and 16). As further addressed in FIG. 1, additional frame components of the pivotal seat back include an opposite end mounted pedestal 26, across which is supported a transverse extending and pivotal seat back base 28 for interconnecting the seat back arm 20 with a further upwardly extending seatback portion 30 (see again FIG. 1) extending in substantially opposing fashion to the seat back 20.

As referenced in FIG. 1, as well as successively throughout the additional views, a preferred embodiment of the present invention contemplates the provision of pairs of front 32 and 34 and rear 36 and 38 latch subassemblies, secured respectively to corresponding underside locations of the rectangular seat bottom frame. Reference is made to the mounting brackets and bolt fasteners for securing each of the latch assemblies and, as is exemplified by bracket 40 and fasteners 42 associated with rear latch subassembly 36.

Rear latch subassembly 38 is largely hidden from view in FIG. 1 (but shown in FIG. 3 et seq.), and understood to be placed in substantially identical fashion to that illustrated at 36. It is also envisioned that additional variants contemplate the incorporation of either a single front and/or rear latch subassembly within the scope of the invention.

Each of the front and rear latch subassemblies engage a correspondingly placed and floor supported striker. It is envisioned that a striker, this typically including a substantially "U" shaped bar, is secured to the vehicle floor and to which a raised cross bar portion is releasably secured by an appropriate latch component associated with the proximately positioned latch assembly.

Figure 3:
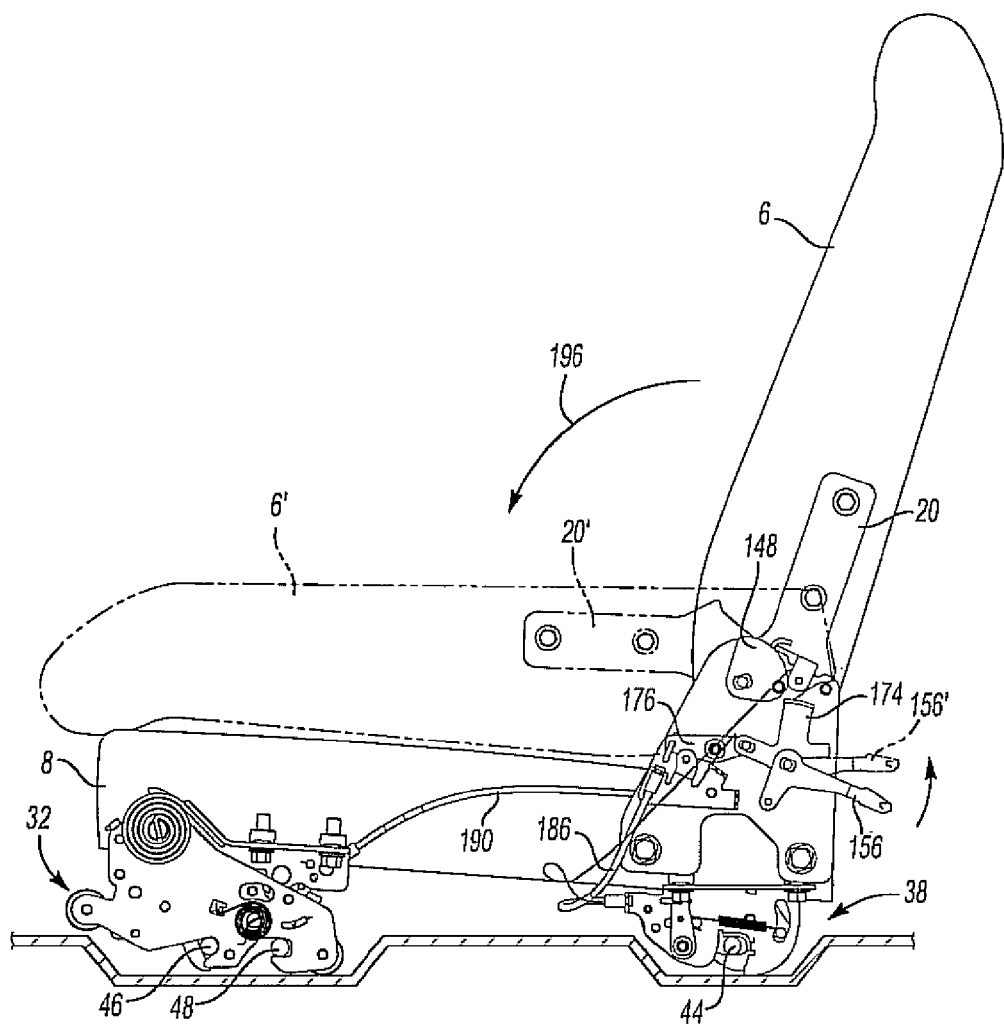
FIG. 3 is a plan view illustration of the seat assembly and illustrating a first pivoting position of a release lever for releasing the seat back to a forward fold flat position and corresponding to disengagement of a first rear latch assembly from an associated rear mounted striker.

In the embodiment illustrated, and as is illustrated in FIG. 3, et seq., a single striker is associated with each of the rear latch subassemblies 36 and 38, whereas pairs of forwardly positioned strikers are associated with each of the latch assemblies 32 and 34, the additional forward strikers providing additional front end support to the seat assembly. By example, the side plan view of FIG. 3 illustrates a rear floor mounted striker 44 (corresponding to rear latch subassembly 38) and a pair of spaced apart and forward floor mounted strikers 46 and 48 (corresponding to front latch subassembly 32).

Prior to discussing the functional capabilities of the forward rotating seat dump and rearward displacing seat removal, detailed descriptions will be rendered, in succession, of the structural features of the rearward and forward latch subassemblies. Referring to the exploded perspective view of FIG. 21, in cooperation with the illustrations of FIG. 3, et seq., selected rear latch subassembly 38 is illustrated and includes an inner support plate 50 and a spaced apart outer support plate 52 exhibiting a typically planar support face to which is secured the various additional components of the latch mechanism.

First and second mounting locations 54 and 56 are defined by angled end portions of the support plate 50, as well as mounting locations 58 and 60 associated with support plate 52, and which, with the provision of mounting bolts, secure to associated locations of the vehicle seat and typically a lowermost location of the seat frame. The support plates 50 and 52, in addition to the remaining components of the latch subassembly 38, are constructed of a durable steel grade material and which provide the necessary properties of strength and durability. The floor mounted striker bar, as previously illustrated at 44 in each of FIG. 3 et seq., cooperates with the rearward latch subassembly 38 through the provision of apertured lower arcuate and receiving edges 62 and 64, corresponding to the outer sandwiching plates 50 and 52 to pivotally secure the rearward location of the seat to the floor of the vehicle interior.

A latch plate 66 is rotatably secured between the inner support plate 50 and spaced apart outer support plate 52. The latch plate 66 includes an aperture 68, positioned in alignment with additional apertures 70 and 72 corresponding with each of the support plates 50 and 52. A rivet 74 (again FIG. 21) secures the latch plate 66 in pivoting fashion between the support plates 50 and 52. A further spacer rivet 76 is illustrated and which aligns and secures within additional aligning apertures 78 and 80 corresponding with plates 50 and 52 and in order to further maintain the plates in a secured and spatially arrayed fashion.

Figure 21:
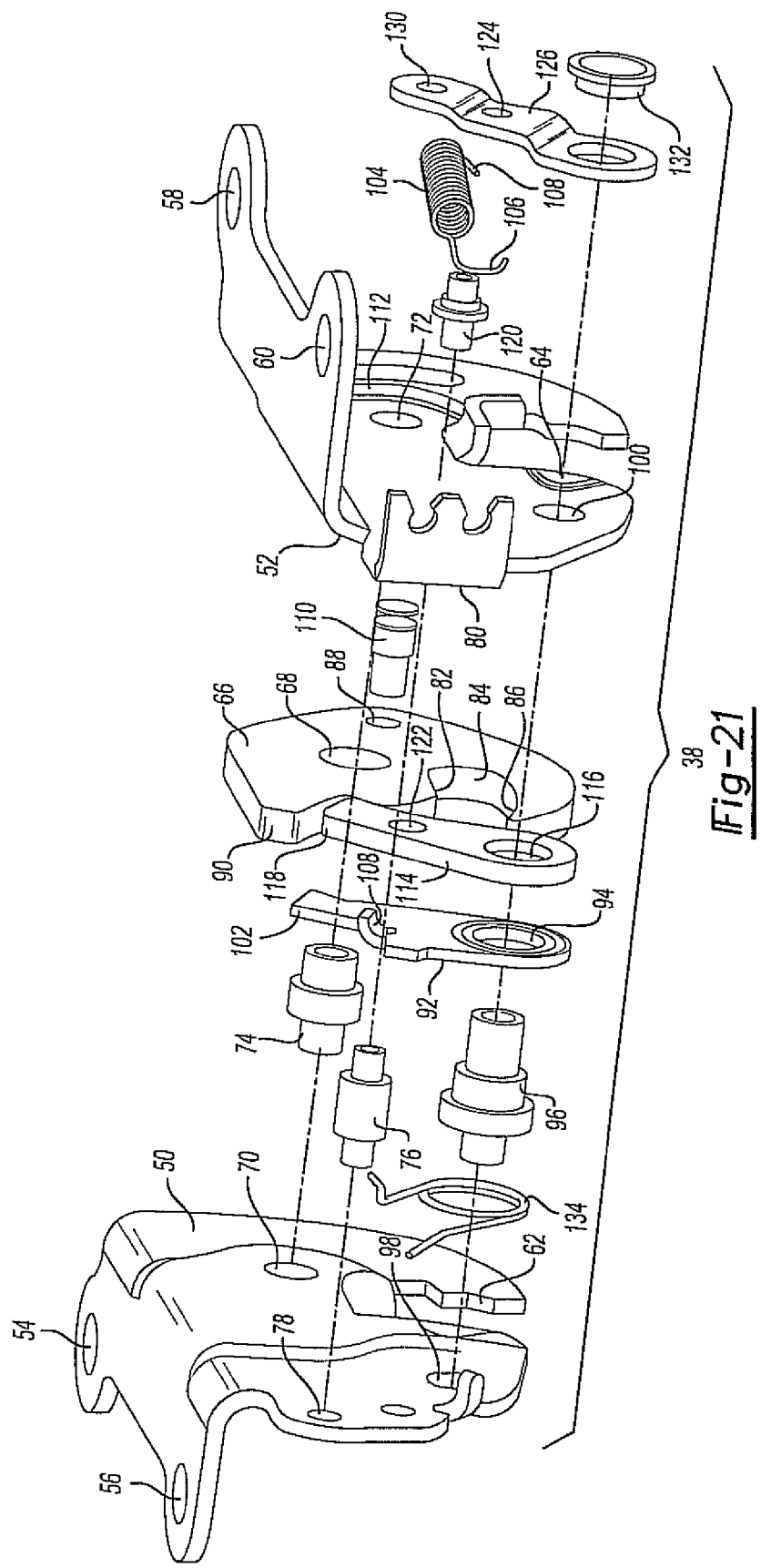
FIG. 21 is an exploded view of a second rear latch mechanism, as shown in FIG. 1, and according to the present invention.

The latch plate 66 includes an arcuate extending inner configuration, see as illustrated by extending and interconnected surfaces 82, 84 and 86 in FIG. 21, and which collectively define an extended recess within the latch plate 66 for receiving the associated striker bar 44 in an engaged position. Additional features of the latch plate 66 include an aperture 88, located towards an end of the latch plate body and spaced from its pivot point (aperture 68), as well as a support surface 90 located proximate the striker receiving arcuate configuration.

A first cam 92 is provided and includes a circular aperture 94. The cam 92 is positioned in overlapping fashion relative to the lower arcuate receiving edges 62 and 64 of the inner 50 and outer 52 plates and such that a mounting pin 96 passing therethrough rotatably affixes the cam 92 within aligning apertures 98 and 100 established between the support plates 50 and 52 in positioned fashion relative to the latch plate 66.

The first cam 92, also referenced as an anti-chuck cam, includes a shoulder 102 which seats, or abuts, against the support surface 90 associated with the latch plate 28 in the engaged position. As will be discussed subsequently, the circular aperture 94 of the first cam 92 is rotatably seated on an associated rounded portion of the pin 96 and, accordingly, is not fixedly, but freely, rotatable relative to the pin 96.

A coil spring 104 includes a first end 106 engaging through an angled portion 108 defined in the anti-chuck cam 92. An opposite extending second end 108 of the spring 104 secures to a pin 110, in turn inserting through an arcuate slot 112 formed in an opposite end surface of the outer plate 52 and secured to aperture 88 defined in the latch plate 66.

A secondary cam 114 is fixedly and rotatably secured to the pivot pin 96, via configured aperture 116, between the inner 52 and outer 50 support plates in coaxial fashion relative to the anti-chuck cam 92. Additional features of the secondary cam 114 include a secondary shoulder 118, positioned proximate the primary support shoulder 102 of the anti-chuck cam 92 and the latch plate support surface 90.

A pin 120 inserts through a slotted aperture in the outer plate 52 (hidden from view in FIG. 21) and seats through an aperture 122 in the second cam 114. The angled tab portion 108 of the anti-chuck cam acts on the projecting end of the pin 120 passing through the cam aperture 122.

An opposite extending portion of the pin 120 seats within an aperture 124 of a cable release lever 126 (see again FIG. 21). As shown by example in FIG. 1, an actuating end of a cable 128 connects to the cable release lever 126, such as at 130 in FIG. 21, and in order to pivot the lever 130 about a bushing 132 secured to the support plate 52. An anti-chuck clock spring 134 secures against a facing surface of the inner plate 50 and includes an angled end abutting the angled tab 108 of the anti-chuck cam, influencing the anti-chuck cam in engaging fashion against said latch plate.

Actuation of the rear latch subassembly is caused by the second cam 114 being actuated to rotate in a direction away from the latch plate support surface. Continued rotation causing the anti-chuck cam 92 to rotate in unison and, upon the shoulder separating from the latch plate support surface 90, forward pivoting of the seat causing the latch plate 66 to rotate relative to the striker 44.

Figure 19:
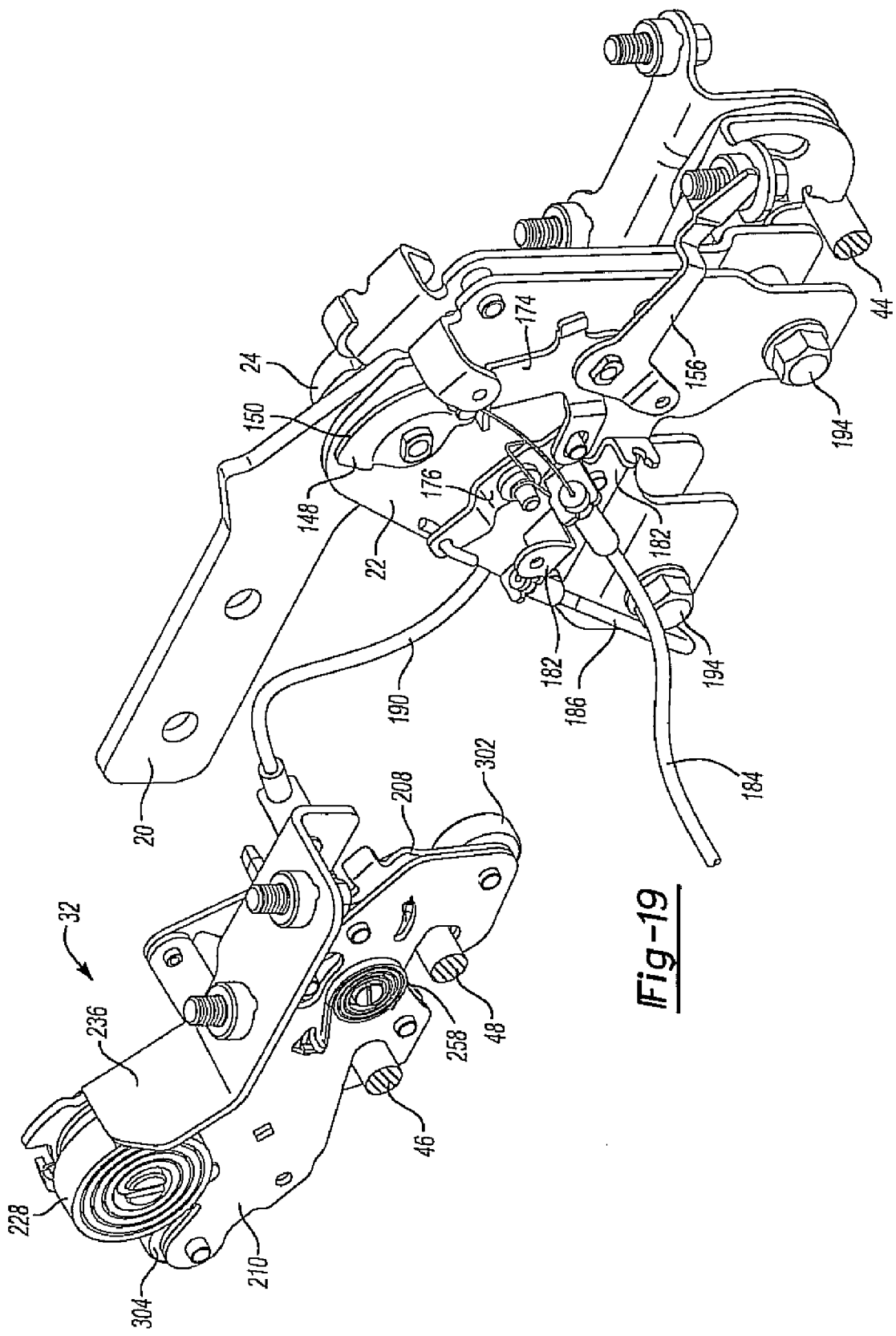
FIG. 19 is a perspective illustration of a selected pair of front and rear floor latches incorporated into a seat assembly according to the present invention.
Figure 20:
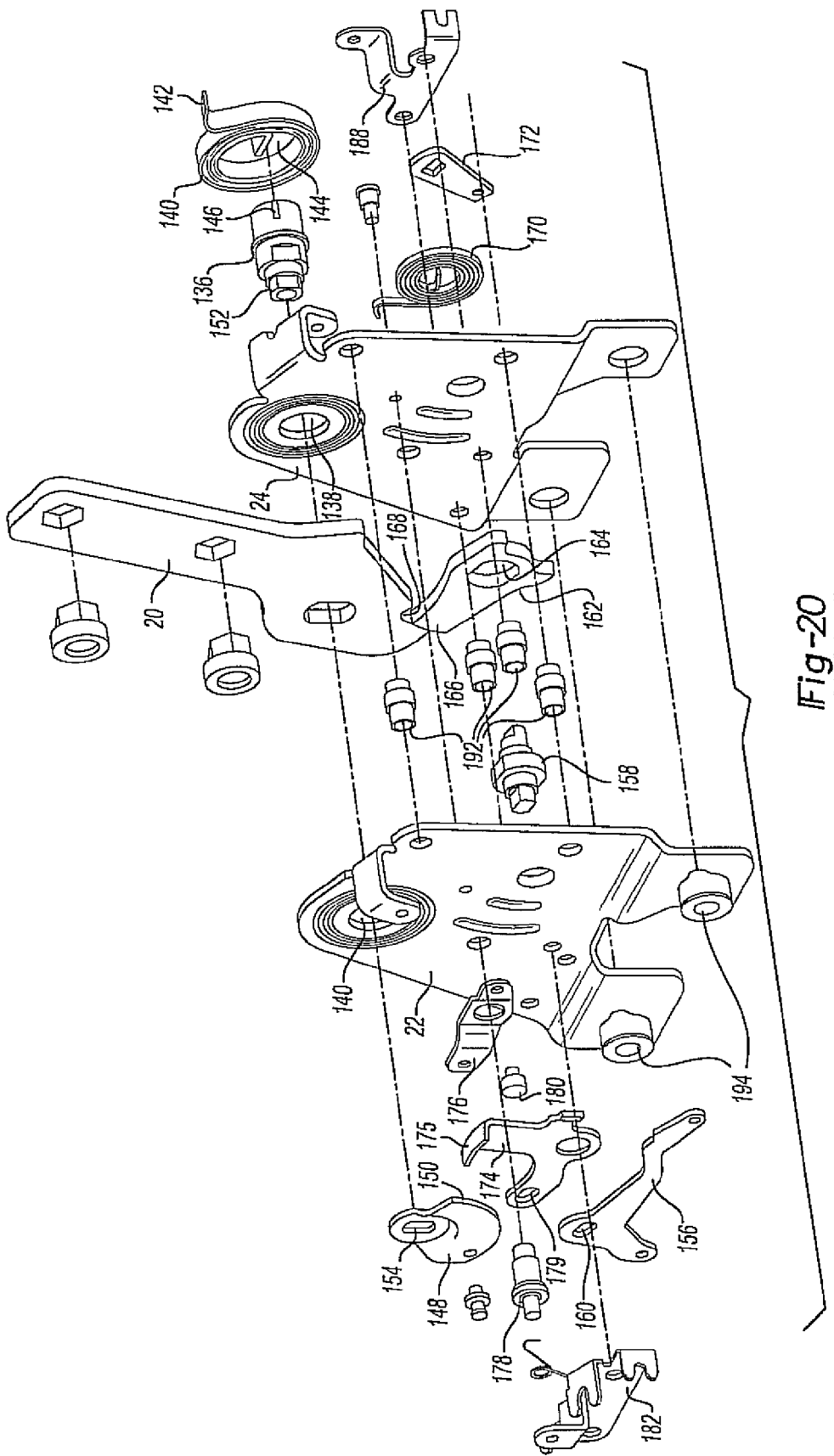
FIG. 20 is an exploded view of the rear latch mechanism illustrated in FIG. 19.

Referring again to FIG. 1, in addition to FIGS. 19, and 20, additional structure associated with the seat back release mechanism again includes the seatback arm 20 rotatably sandwiched between the pair of inner and outer support plates 22 and 24, and which are in turn secured at their lower end by fasteners to the seat bottom frame (see in particular FIG. 1). The seatback arm 20 is biasingly influenced in a forward folding direction by means of a main pivot pin 136 extending through aligning apertures 138 and 140, plates 22 and 24 the pin 136 being acted upon by a clock spring 140 having an outer curled end 142 biased against the support plate 24 and an inner curled end 144 seating within a notched end 146 of the pin 136.

An interlock plate 148 is rotatably mounted to a projecting end of the main pivot 136, and upon an exterior surface of the outer support plate 22. The plate 148 includes an arcuate rounded edge 150 and is caused to rotate in unison with the seatback arm 20 by virtue of a keyed end 152 of the main pivot pin 136, which seats within a likewise keyed aperture 154 formed in the interlock plate 148.

A release lever 156 is secured to an exterior surface of the support plate 22 and by a cam pivot 158 having a first keyed end seating through a likewise key shaped aperture 160 defined in the release lever 156. A cam 162 is rotatively slave to the release lever 156, see keyed central aperture 164 which seats over a likewise keyed central configuration of the cam pivot 158. The cam 162 includes a projecting upper shoulder 166 engaging a recess surface 168 in an underside of the seatback arm 20 (see again FIG. 20) to engage the biased seatback arm 20 in the upright design position.

An opposite extending edge of the cam pivot 158 is biased in a rotational direction opposite that of the seatback arm 20 by a cam pivot spring 170. A floor latch release lever 172 secures to a keyed end of the cam pivot 158, located on an exterior surface of the support plate 24.

An interlock lever 174 is rotatably secured to an exterior surface of said outer support plate 22 and, along with the cam 162, is coaxially mounted to the release lever 156 about the cam pivot 158. An arcuate and angled projecting edge portion 175 of the interlock lever 174 abuts the arcuate rounded edge 150 of the interlock plate 148, to maintain the seatback 20 in an upward design position.

Figure 7:
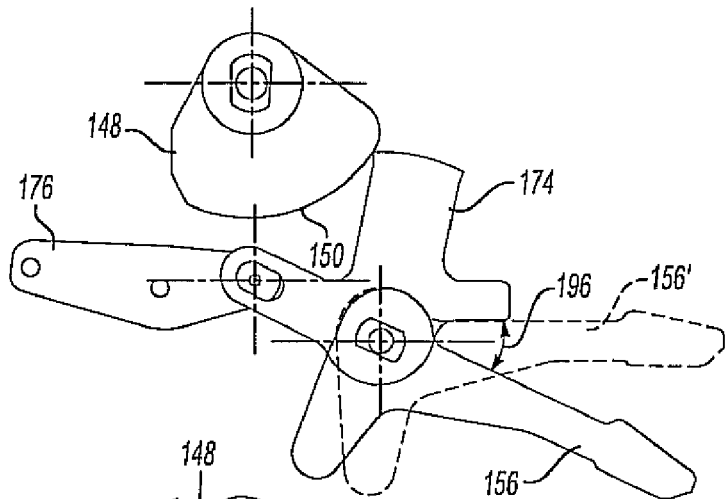
FIG. 7 is an enlarged sectional illustration of the seat release lever actuated to the position illustrated in FIG. 3.
Figure 8:
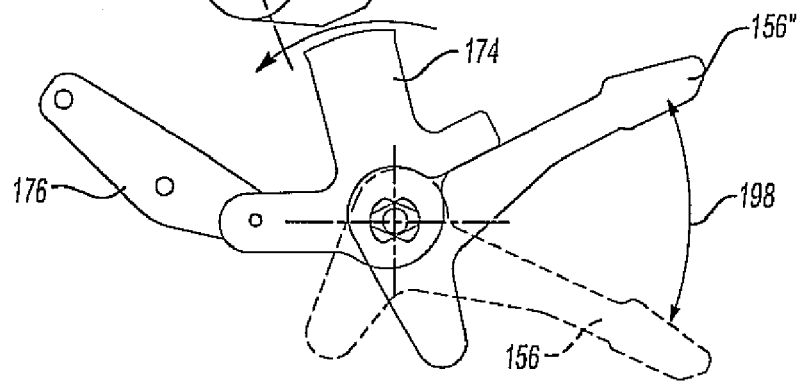
FIG. 8 is a successive sectional illustration of the seat release lever actuated to the position illustrated in FIG. 4.

A secondary latch release lever 176 is mounted by a pivot pin 178 to the support plate 22, and is linkage secured to an aperture 179 of the interlock lever 174 by means of a pin 180. As illustrated in FIGS. 7, 8 and 19, actuation of the release lever 156 successively actuates the interlock lever 174 and secondary latch release lever 176 by virtue of the linkage mechanism created.

Additional features of the release lever mechanism include the provision of a cable support bracket 182 and by which first 184 and second 186 rear floor latch release cables (see FIG. 1) extend from the linkage associated locations of the interlock lever 174 and secondary latch release lever 176, respectively, and to respective locations associated with the first 36 and second 38 rear latch subassemblies. A further cable support bracket 188 (see again FIG. 20) secures to an opposite exterior surface of the support plate 24, proximate the floor latch release lever 172, and which supports a further cable 190 (see again FIG. 1) extending to a selected front latch subassembly.

Yet additional features of the release lever package of FIG. 20 is the provision of a plurality of cable bracket rivets, see at 192, these engaging mating apertures defined in the support plates 22 and 24 and in order to define a desired spatial relationship of the assembly and in particular the pivotally secured seatback arm 20 and pivoting cam 166. Also, lower mounting bolts are illustrated at 194 (see again FIG. 20) associated with the support plate 22 and for securing to like apertured locations associated with the support plate 24.

Figure 2:
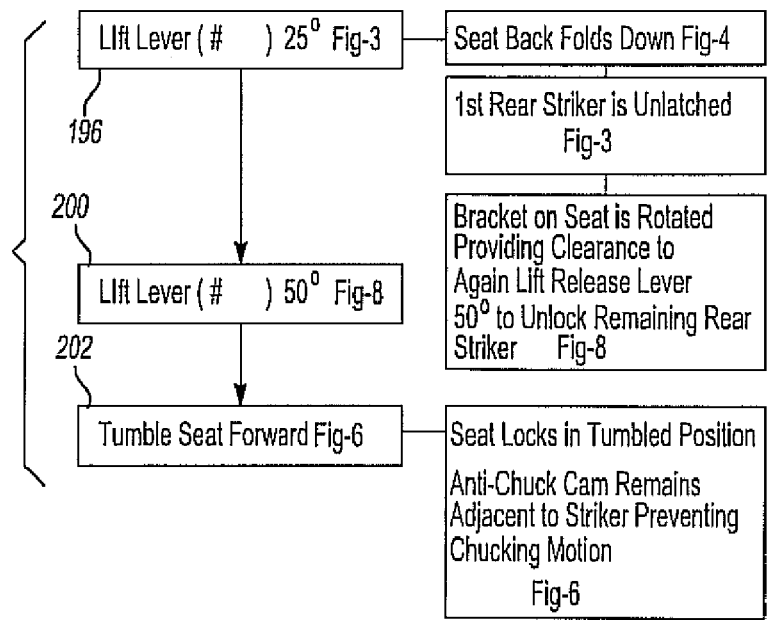
FIG. 2 is a schematic of an initial seat tumble sequence according to the present invention and including the folding of the seat back against the seat bottom, and succeeding release of the seat bottom from the rearward located strikers for permitting tumble of the folded seat to a forward locked position.

Referring now to FIG. 2, a schematic illustration of an initial forward seat tumble (dump) sequence is shown according to the present invention. Viewing FIG. 2, in cooperation with the succeeding illustrations of FIGS. 3-8, explanation is given of the folding of the seat back against the seat bottom, succeeded by the release of the seat bottom from the rearward located strikers for permitting tumble of the folded seat to a forward locked position.

Referring to initial step 196 in the schematic of FIG. 2, in cooperation with the enlarged sectional illustration of FIG. 7, initial actuation of the release lever 156, such as clockwise to position 156' (and corresponding to a ccw rotation of 25° in the example illustrated and shown by arrow 196), results in corresponding and slaved rotation of the cam 154, as well as the floor latch release lever 172. At this point, the projecting upper shoulder 166 of the cam 162 rotates out of engaging contact with the recessed underside surface 168 of the seatback arm 20, whereby the influencing action of the clock spring 140 causes the seatback arm 20 to rotate to a fold flat position against the seat bottom, see arrow 196 in FIG. 3 for influencing seatback 6 to rotated position 6' flat against seat bottom 8.

Concurrent with the seatback folding flat, the first cable 184 is actuated by virtue of the slaved initial rotation of the interlock lever 174, this causing rotation of the inboard located rear latch subassembly 36 and in particular rotating its associated cable release lever 126 (see FIG. 21) to initiate the actuation of the latch. 66, anti-chuck cam 92 and cam 114 to the disengaged position relative to the associated floor mounted striker.

Figure 4:
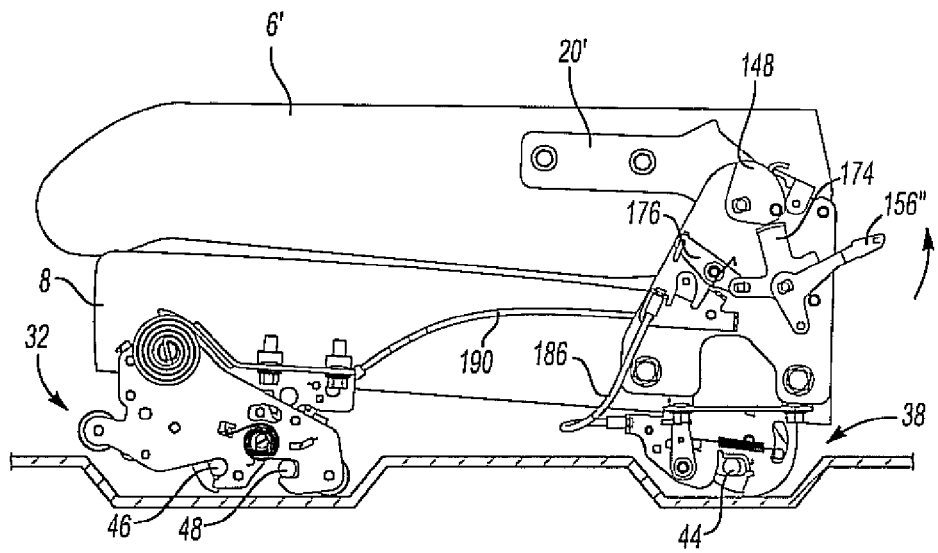
FIG. 4 is a succeeding plan view to that shown in FIG. 3 and further illustrating a second pivoting position of the release lever, causing disengagement of a second rear latch assembly from its associated striker.

As successively illustrated in FIG. 4, in cooperation with the sectional illustration of FIG. 8, the release lever is then actuated to a further rotational position, e.g. 50° as referenced by arrow 198 in FIG. 8) and step 200 in FIG. 2. This in turn causes disengagement of the second (outboard) rear latch assembly 38 from its associated striker 44, and by virtue of the actuation of cable 186 as acted upon by the linkage actuated motion of the latch release lever 176.

Figure 5:
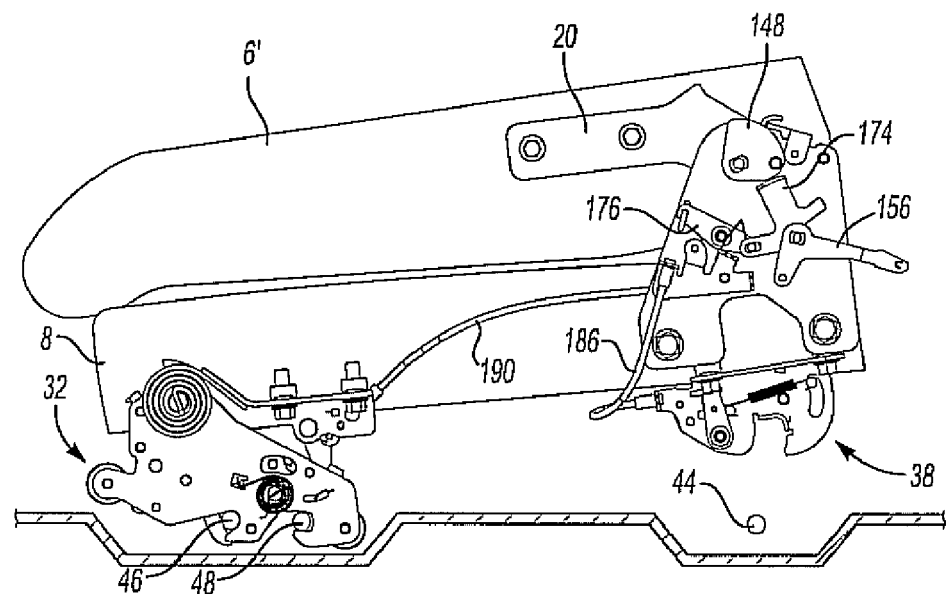
FIG. 5 is a successive illustration to that shown in FIG. 4 and by which the folded flat seat initiates forward rotation to a tumble position.
Figure 6:
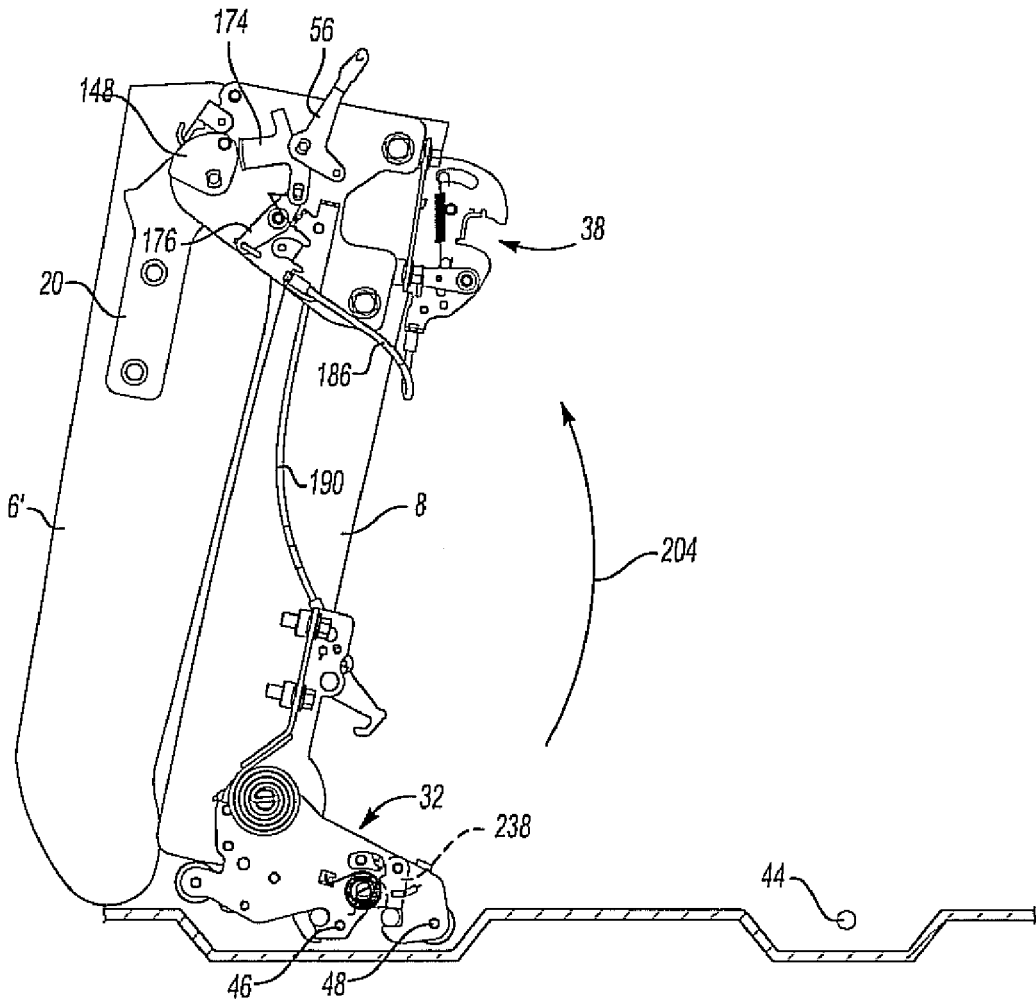
FIG. 6 is a still further plan view illustration of the seat in a forward tumbled and locked position.

At this point, FIG. 5 successively illustrates the seat shown in FIG. 4, and by which the folded flat seat initiates forward rotation to a forward dump position, see also step 202 in FIG. 2. As will be subsequently described in reference to the front striker engaging latch subassemblies either, and typically both, further include a biasing, typically clock, spring to influence the seat bottom in the forward rotating (dump) position. FIG. 6 successively illustrates the seat in a most forward tumbled and locked position, see directional arrow 204, and by which the seat can be locked in the forward position. Prior to engaging in a detailed description of the forward (second) latch subassemblies, and the associated rearward removal protocol of the seat assembly, it is understood that an anti-chuck cam as will be subsequently referenced at 238 remains in adjacent position to the secondary forward striker 48, and in order to prevent chucking motion of the same during forward dump of the seat.

Figure 9:
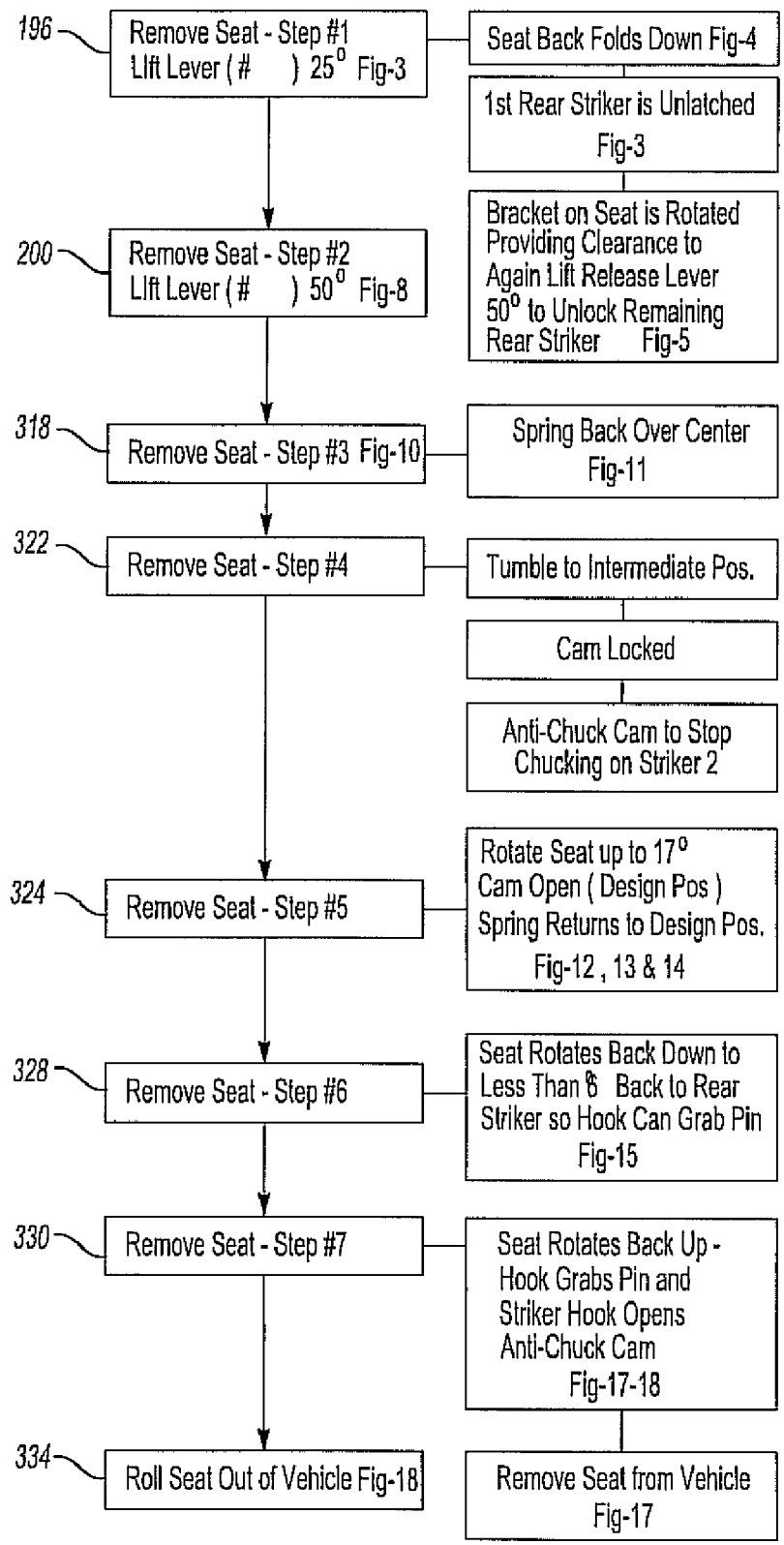
FIG. 9 is a schematic illustration incorporating elements of the initial seat tumble sequence described in FIG. 2, in cooperation with a multi-position release protocol for permitting rearward removal of the seat.

With reference now to the schematic illustration of FIG. 9, in cooperation with the succeeding views of FIGS. 10-18, illustration is made of the protocol associated with the rearward displacing removal of the rear row mounted seat, and which is accomplished by virtue of the configuration of the forward latch subassemblies 32 and 34. As explained previously, the succeeding protocol associated with the rearward seat removal follows the initial rear latch disengagement protocol (inboard 36 and outboard 38 subassemblies in progression) and prior to the seat being rotated to the most forwardly and locked position, again shown in FIG. 6.

Referring again to FIG. 9, initial protocol steps 196 and 200 are restated from FIG. 2, and by which the initial seat tumble sequence is repeated and the seat is released from the rear strikers to forwardly rotate (between positions illustrated FIGS. 5 and 6 and prior to achieving a most forwardly rotated and locked position). As with the descriptions rendered of the forward latch subassemblies, a detailed explanation of the construction of the forward latch subassemblies 36 and 38 will now be made prior to explaining the functionality associated with the removal steps of FIGS. 9-18.

Figure 22:
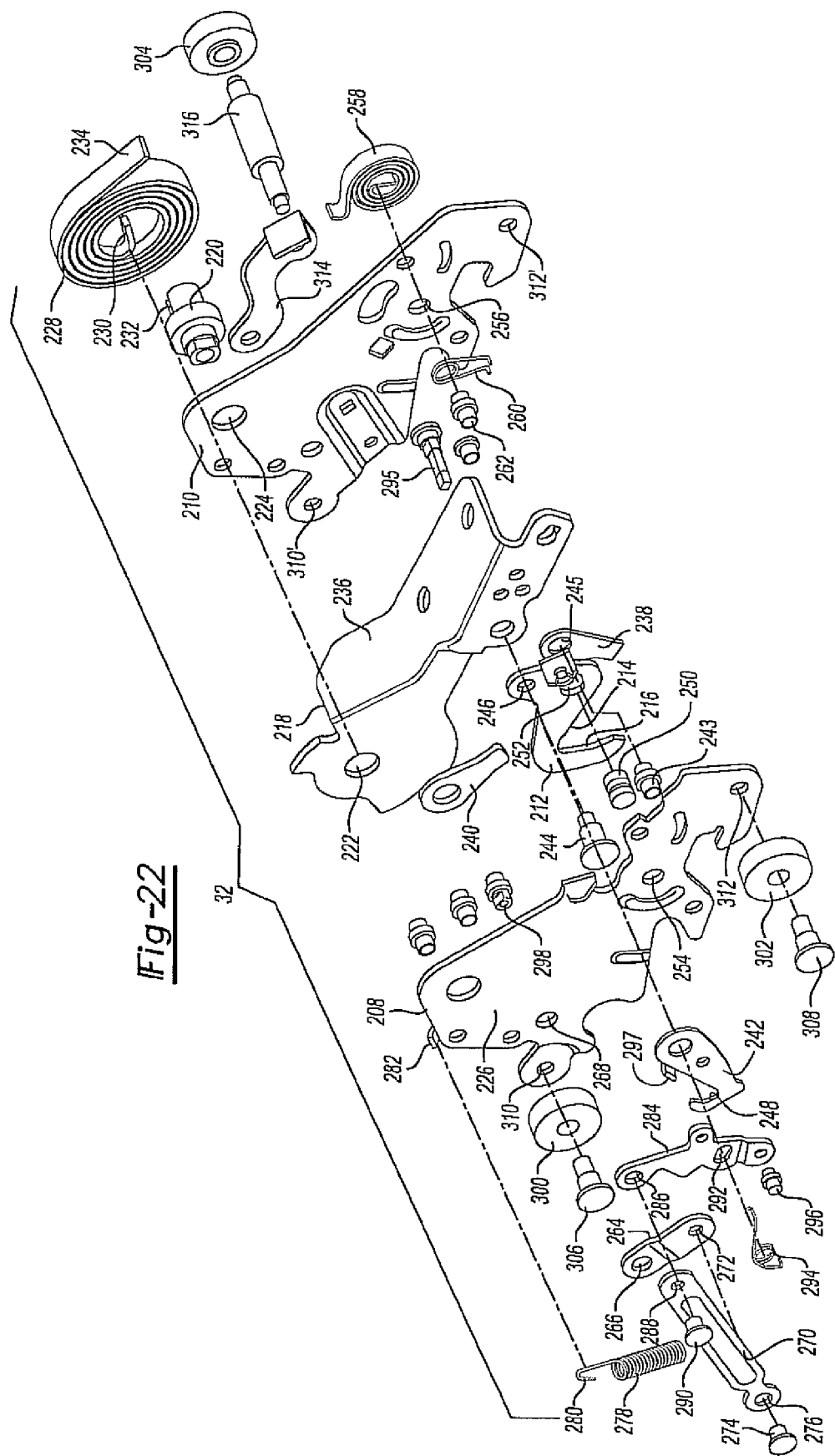
FIG. 22 is an exploded view of a selected and front floor latch mechanism according to the present invention.

Referring to FIG. 22, an exploded illustration is given of a selected forward latch subassembly, e.g. subassembly 32. As explained previously, each of the forward latch subassemblies are designed to engage an individual pair of floor mounted strikers (see again strikers 46 and 48 associated with forward latch subassembly 32 in FIG. 19). It is again understood however that the forward latch assemblies can also be constructed for engaging only a single forward striker.

The second latch mechanism, or subassembly, includes a pair of support plates 208 and 210 sandwiching an arcuately configured latch 212 therebetween. The arcuate configuration of the latch 212 is such that it is angled, see at 214 and 216 in FIG. 22, to surround an associated striker (e.g. 48).

An intermediate support plate 218 is secured in interposing fashion between the pair of support plates 208 and 210, such that a main pivot pin 220 secures through aligning apertures in the intermediate plate 218 (at 222), as well as the outer sandwiching plates 208 and 210 (at 224 and 226, respectively). The clock spring, previously identified and illustrated at 228 in FIG. 22, includes an inner curled end 230 seating within a notched end 232 of the main pivot pin 220, an outer extending end 234 abutting an angled upper surface 236 of the intermediate plate 218 in order to bias the seat bottom in forwardly rotating fashion (as previously shown in FIG. 5) upon release from both rear situated strikers. The angled upper surface 236 is further mounted to an underside location of the seat bottom frame (see again FIG. 1) in order to secure the forward latch subassemblies in the manner illustrated.

A pair of antichuck cams are illustrated at 238 and 240 and which are pivotally supported in abutting engagement with each of the selected pair of forward situated strikers. A first of the anti-chuck cams is referenced by the rearward position cam 238 and which is arrayed in coplanar and abutting contact with an edge location associated with the arcuately configured latch 212.

Figure 17:
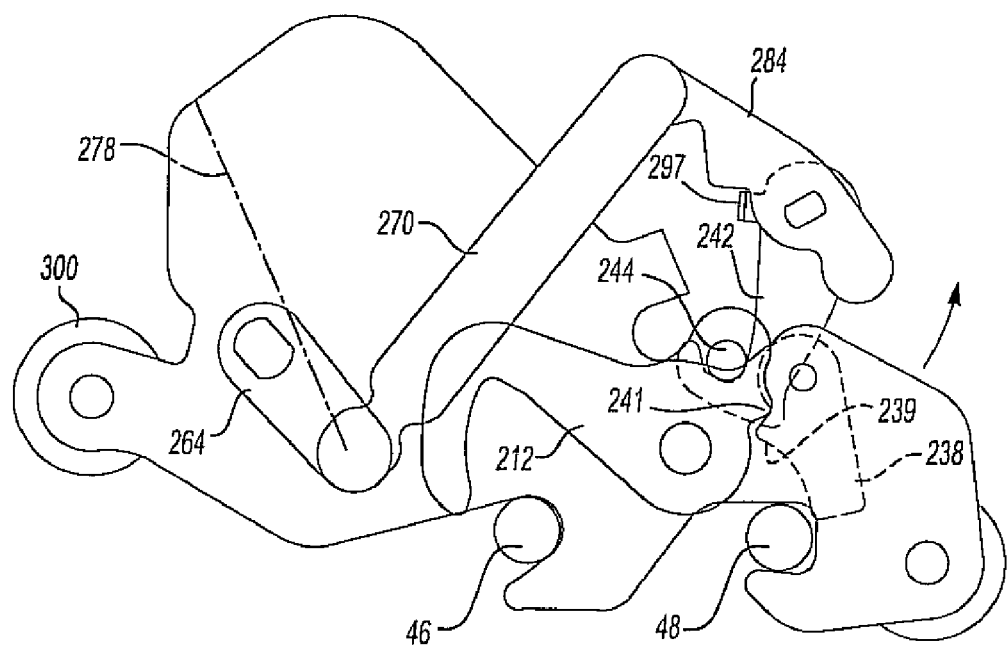
FIG. 17 is a final succeeding illustration of the selected front floor latch, further to that illustrated in FIG. 15, and by which rearward pulling motion upon the seat causes rotating release of the striker engaging hook, concurrent with pivoting disengagement of the striker engaging and anti-chuck cam.

As referenced in succeeding illustrations, and as best shown in FIG. 17, the anti-chuck cam 238 and latch 212 include alternating and mating shoulder and recess portions, see at 239 and 241, respectively, and which, as will be subsequently explained in greater detail, causes rotation of the latch 212 in a first unseating direction away from the striker pin 48 to create an opposite rotation of the anti-chuck cam 238 in an opposite unseating direction. A pivot pin 243 mounts through an aperture 245 of the cam 238 to secure the same between the plates 208 and 210. Each of the cams 238 and 240 operate, in the engaged position, to prevent chucking motion of the seat about the forward situated strikers and, as will be subsequently explained, disengaging rotation of said latch plate relative the striker causes simultaneous disengaging rotation of the anti-chuck cams.

The second latch mechanism, e.g. at 32, as will be described, includes a spring-driven linkage assembly for actuating a hook 242, responsive to a combination of actuation of forward extending cable 190 and pivotal rotation of the seat frame about the forward strikers, and in order to engage a lockout pin 244 engaged to and extending the arcuate latch 212, through aperture 246 associated with the same, the pin 244 being located proximate a curled lower end 248 of the hook 242 as will be subsequently described.

The latch plate 212 is pivotally mounted between the support plates 208 and 210 (in an offset fashion relative to the striker pin 244 mounting through aperture 246) by a pivot pin 250 extending through apertures 252 (of latch 212) and 254/256 of outer support plates 208 and 210. A clock spring 258 secures against an exterior face of the support plate 210 and is engaged by the pivot support pin 250 associated with the arcuately configured latch 212 in order to bias the latch in a striker engaging fashion. A further cam spring 260 engages the rear anti-chuck cam 238 (through cam pivot 262) and in order to likewise bias the anti-chuck cam in an engaging relationship relative to the rearward most 48 of the forward situated strikers.

Referring again to FIG. 22, the hook 242 actuated linkage assembly includes a first lever 264 pivotally secured to an outer facing surface of support plate 208, and such as by a pin (not shown) mounting through aligning apertures 266 in the lever 264 and at 268 associated with the plate 208. An elongated link 270 is pivotally and translatably secured to a free end 272 of the first lever 264, see rivet 274 engaging through aperture 276 in link 270 to secure to free end 272 of first lever 264.

A coil spring 278 is secured at a first end 280 to a fixed location (see angled tab edge 282) associated with the support plate 208, and at a second end to the location of the link 270 pivotally connected to the first lever 264. A hook actuating lever 284 is pivotally and translatably secured at a first end 286 to a second end 288 of the elongated link 270 (see rivet pin 290 engaging through aligning apertures in the elongated link 270 and lever 284).

The hook 242 engages a midpoint location 292, a spring hook lockout 294 maintaining the hook 242 in a rotatively biased manner in a direction towards the lockout pin 244 (see pin 295) and again such that the lockout pin projects from a configured edge of the arcuate latch 212 in proximity to said spring actuated hook 242. An opposite end of the hook actuating lever 284 includes an attaching pin cable, see at 296, and to which is engaged an end of the linearly translatable cable 190 previously described and actuated by the actuation of cam pivot supported and floor latch release lever 172 of the seatback release mechanism (see again FIG. 20). The hook 242 further includes an angled detent portion 297 engaged by the hook actuating lever 284 upon actuation thereof and in order to reposition said hook in engaging fashion relative the lockout pin 244.

As will be subsequently explained in additional detail, initial actuation of the cable 190 may operate, through the described linkage, to set the hook 242 to an intermediate position and prior to selective up and down rotation of the seat bottom relative to the forward strikers in order to further actuate the linkage and complete actuating location of the hook 242 to an engagement position relative to the lockout pin 244. A suitable cable extending from the release lever 156 can further be actuated, through a rotation of the release lever 156 in the seat locked position of FIG. 6, in order to release the seat for subsequent rearward rotation. As further shown in FIG. 22, the second of the anti-chuck cams, see again at 240, is pivotally slaved to the rotation of the first lever 264, by virtue of keyed cam pivot pin 298 securing through plate aperture 268.

Additional features associated with the second latch subassemblies also include at least one, and typically a plurality of, roller supports located proximate a lower edge for facilitating eventual rearward displacement of the seat relative to the vehicle. In particular, and again referring to FIG. 22, a plurality of three roller supports 300, 302 and 304 are illustrated associated with each of the second latch subassemblies. The first pair of roller supports 300 and 302 are secured by rivet supports 306 and 308 to respective lower edge locations, see as defined by apertures 310 and 312, in the selected plate 208 and further at 310' and 312' in plate 210. The third roller 304 is secured to an opposite facing exterior surface of support plate 210 by a bracket 314 and supporting axle 316.

Figure 10:
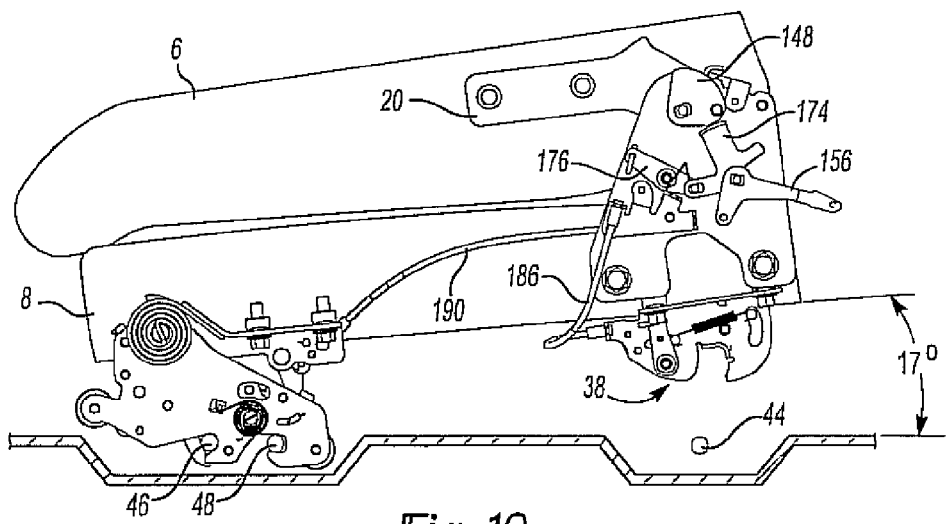
FIG. 10 is a first plan view illustration of the seat assembly, according to the seat removal protocol of FIG. 9, and by which the seat is pivoted from a position intermediate the forward rotating position of FIG. 5 and the fully forward tumbled and locked position of FIG. 6.

Given the above description, and referring again to the schematic of FIG. 9, a first step 318 succeeding the rear striker disengagement protocol (see at steps 196 and 200) and includes the seat being in a forwardly pivoting condition, such as referenced in each of preceding FIG. 5 and FIG. 10, and by which the seat is arrayed in a position intermediate the forward rotating position of FIG. 5 and the fully forward tumbled and locked position of FIG. 6.

Figure 11:
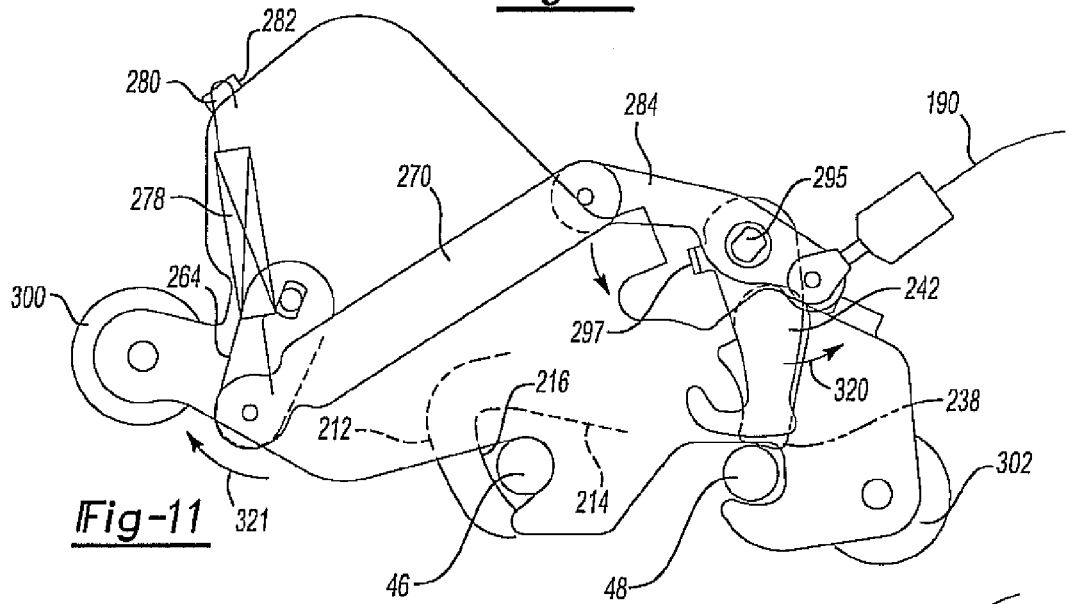
FIG. 11 is a sectional illustration of a selected front floor latch assembly corresponding to the seat position of FIG. 10 and in particular showing an over-center traveling condition of a coil spring preceding actuation of a pivotally associated hook.

FIG. 11 is an initial sectional illustration of highlighted portions of the hook actuating linkage previously described (see again FIG. 22) of the selected front floor latch assembly corresponding to the traveling seat position of FIG. 10 and step 318 in the schematic of FIG. 9. Specifically, and again upon actuation of the cable 190 on hook actuating lever 284, an over-center traveling condition of the coil spring 278 is created by rearward displacement, see arrow 320, of the hook 242 caused by likewise combined pivoting and translational motion of the lever 284, as well as opposite rotation, see arrow 321 associated with lever 264.

Figure 12:
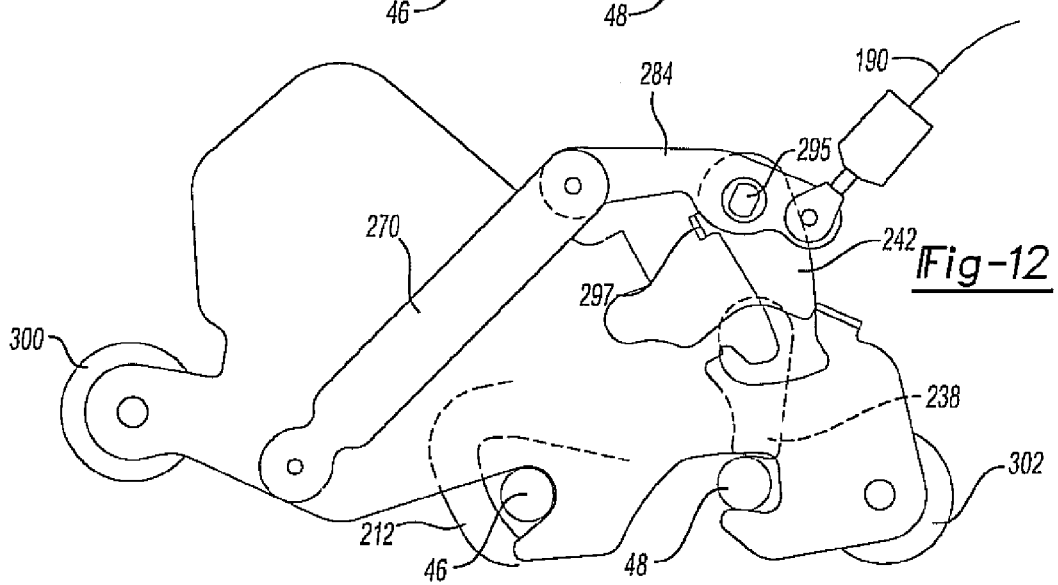
FIG. 12 is a succeeding illustration of the front floor latch of FIG. 11, illustrating an actuated position of the spring actuated linkage, by which the hook is displaced to an intermediate lockout pin engagement position.

FIG. 12 is a succeeding illustration of the front floor latch of FIG. 11, illustrating an actuated position of the spring actuated linkage, and by which the hook 242 is displaced to an intermediate lockout pin engagement position. This is further referenced by step 322 in FIG. 9 and by which the positioning of the anti-chuck cam 238 is retained in its abutting position against the top surface of the striker 48, throughout the removal protocol, and to prevent undesirable chucking motion.

Figure 13:
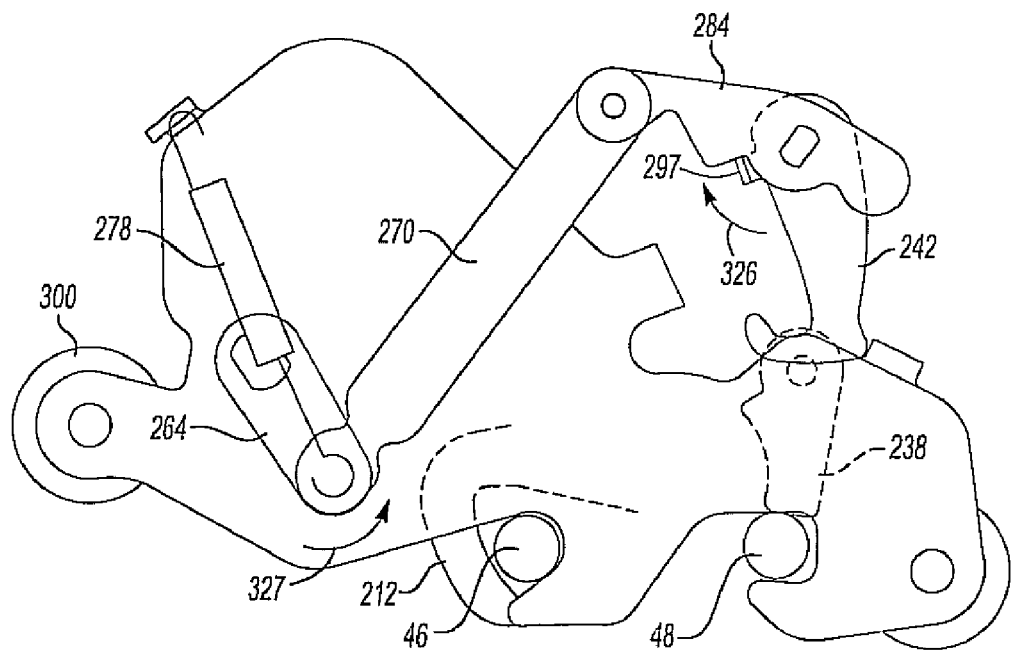
FIG. 13 is a further succeeding illustration of the front floor latch assembly, corresponding to the seat being pivoted to a determined angular orientation, at which the coil spring begins to return to a design position, resulting in forward actuating motion of the linkage directed hook.
Figure 14:
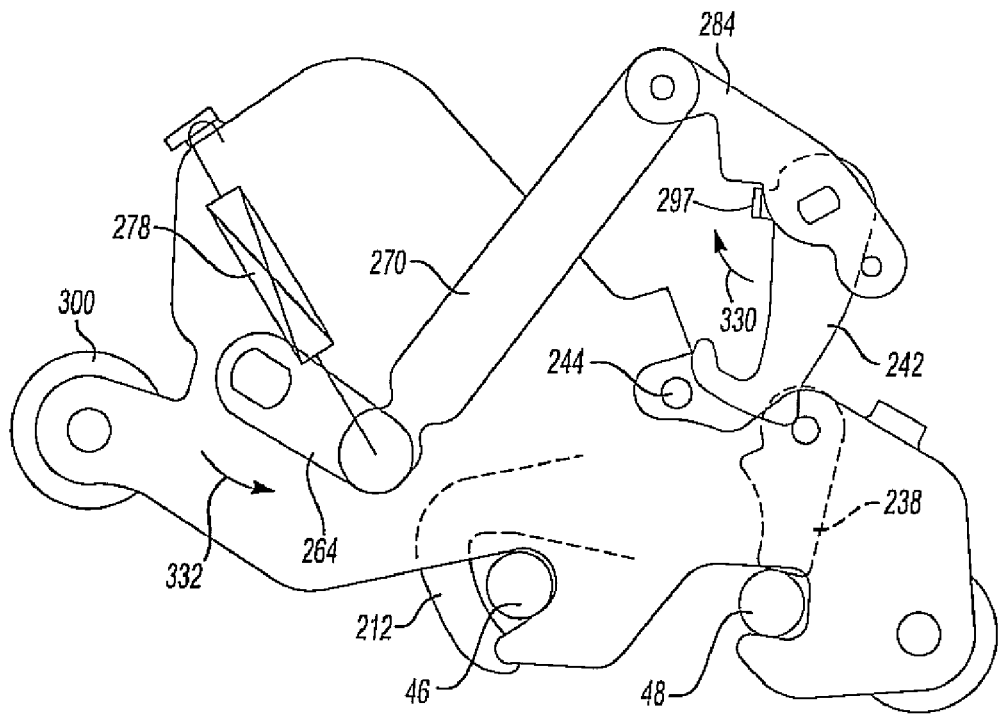
FIG. 14 is a further succeeding illustration of the front floor latch shown in FIG. 13, and illustrating the hook in fully forwardly rotated and pre-engagement position relative to the lockout pin.

Step 324 of FIG. 9 references a succession of linkage actuated steps, from FIG. 12 through FIGS. 13 and 14, and by which hook 242 is successively actuated from the intermediate position of FIG. 11 to a final, lockout pin 244 engaging position. In FIG. 13, the coil spring 278 begins to return to a design position, resulting in forward actuating motion of the linkage directed hook 242, see arrow 326 and opposite rotation 327 of lever 264. This corresponds with upward rotation of the seat,. to at least 17° relative to the horizontal (see again FIG. 10).

Figure 16:
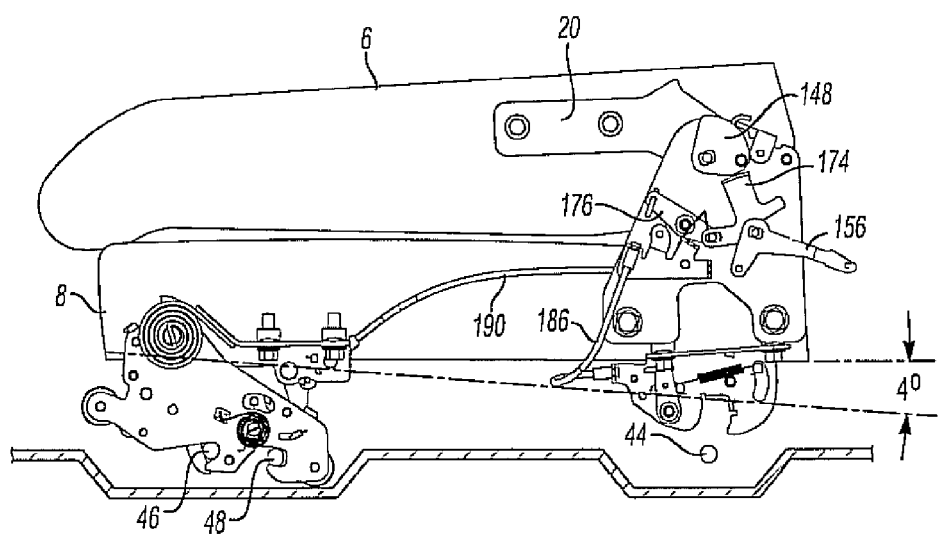
FIG. 16 is a side plan view of the seat assembly rotated to a position corresponding to the lockout engagement of the front floor latch as illustrated in FIG. 15.

Step 328 of FIG. 9 references a further removal step whereby the seat is rotated back down to less than 6° (such as to 4°) relative to the horizontal (see FIG. 16). At this point, the spring 278 completes a final over-center actuation, and such that the hook 242 completes its forward rotating actuation, see arrow 330 as well as arrow 332 corresponding to successive pivoting of the linkage controlled lever 264. As shown in FIG. 14, the hook 242 is now arrayed in a fully forwardly rotated and pre-engagement position relative to the lockout pin 244.

Figure 15:
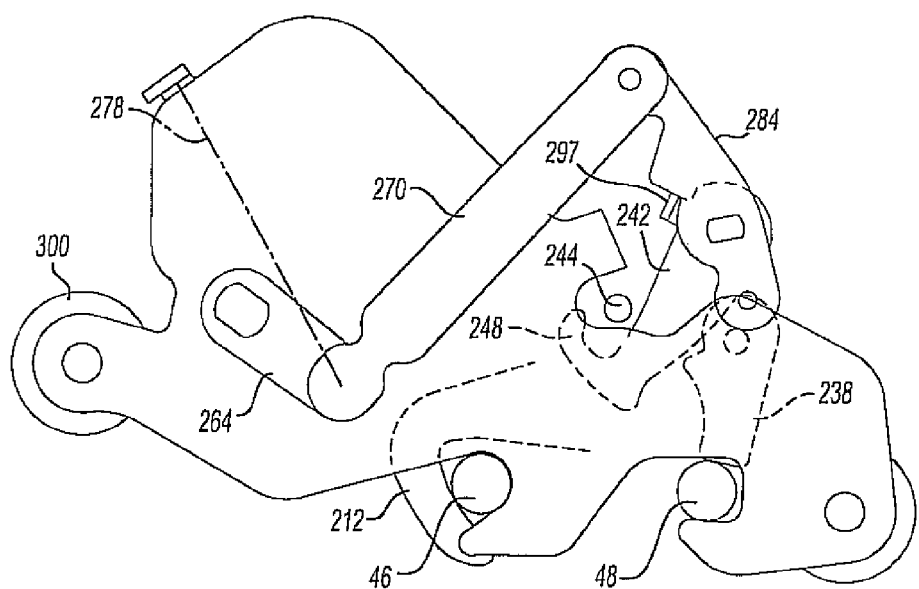
FIG. 15 is a further succeeding illustration of the front floor latch of FIG. 14 showing the hook engaging the lockout pin.

FIG. 15 is a further succeeding illustration of the front floor latch of FIG. 14, and showing the hook 242 engaging the lockout pin 244. This is created by a slight downward rotation of the seat, whereby the engaging end portion 248 of the hook 242 contacts the lockout pin 244 and is caused to slightly rotate and biasingly reset in engaging contact underneath the pin 244 (this being further caused by the action of biasing spring 294). In this position, the seat is prepared for rearward displacement and removal from the vehicle.

Figure 18:
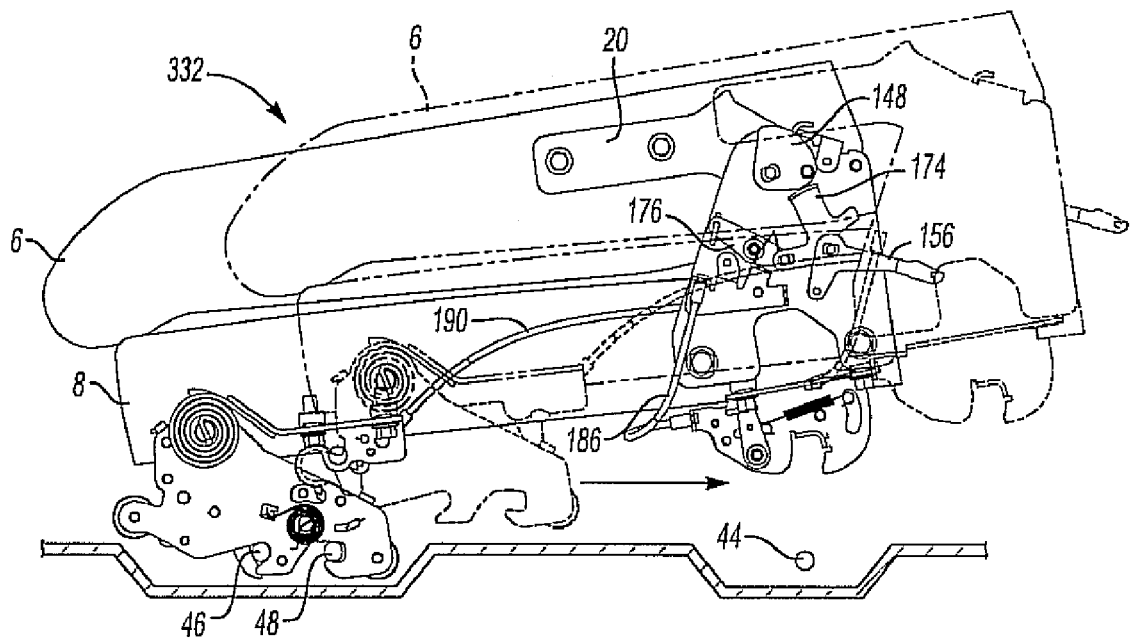
FIG. 18 is a side plan view of the seat assembly being rearwardly removed and corresponding to the position of the front floor latches as illustrated in FIG. 17.

Referencing step 330 of FIG. 9, in cooperation with the latch illustration of FIG. 17 and the seat plan view of FIG. 18, rearward motion of the seat (see FIG. 18) causes the rotating release of the arcuately configured latch 212, concurrent with pivoting disengagement of an anti-chuck cam 238. This is again due to the rotating motion imparted to the latch 212 by virtue of the hook 242 acting upon the offset mounted lockout pin 244, causing the latch 212 to rotate in a first disengaging position away from the associated striker 48 and in turn causing the alternating shoulder and recess configuration 239 and 241, established between the anti-chuck cam 238 and arcuate latch 212, to again cause the anti-chuck cam 238 to rotate in an opposite disengaging relationship relative to the striker 48. Concurrently, the other anti-chuck cam 240 (associated with the forward selected striker 46) is caused to rotate out of engagement by virtue of the slaved rotation to the lever 264. As again shown generally at 332 in FIG. 18, the seat assembly displaces rearwardly for removal from the vehicle (see also step 334 in FIG. 9).

Accordingly, the present invention teaches a novel and improved structure for facilitating selective seat dump or rearward displacing removal from within a vehicle, such further incorporating a simplified structure. It is also envisioned that a powered version of the seat assembly could be provided, utilizing substantially the structure disclosed herein, and in substitution of the manual dump and removal protocol discussed. Having described our invention, other and additional preferred embodiments will become apparent to those skilled in the art to which it pertains, and without deviating from the scope of the appended claims.

We claim:

1. A multi-functional latch assembly associated with a rear row mounted and removable vehicle seat, the seat exhibiting a seat back pivotally secured relative to a seat bottom, said latch assembly releasably engaging the seat bottom to front and rear floor supported strikers to permit at least one of forward rotating seat dump and rearward seat removal, said assembly comprising:

a first latch mechanism mounted to a selected rear location of a frame associated with the seat bottom and including a latch plate configured to engage the rear striker;

a release lever secured to a further location of said seat frame and actuated a degree to permit the seat back to pivotally fold flat against the seat bottom, said release lever actuated a second degree to disengage said latch plate from the rear located striker and to permit forward rotation of the seat about the front supported striker;

a second latch mechanism mounted to a selected front location of the seat frame and including an arcuately configured latch engaging the front striker; and said second latch mechanism further comprising a spring actuated and combination displaceable and pivotable hook actuated via a linkage assembly for engaging a lockout pin which is in turn in contact with said arcuately configured latch at a location offset from a pivot point of said latch and such that, upon a selected pivotal displacement of said seat frame relative the front floor supported striker, said hook is manipulated into contact with lockout pin, causing said latch plate to pivot out of contact with said front striker and thereby permitting the seat subsequently being rearwardly displaced to permit removal from the vehicle.

2. The assembly as described in claim 1, said release lever actuating a seatback arm biasingly influenced in a forward folding direction, a cam rotatively slaved to said release lever and engaging said seatback arm in an upright design position, upon being actuated by rotation of said release lever, against a rotational spring bias opposite that of said seatback arm, said cam disengaging from said seatback arm to permit the seat back to forwardly rotate against the seat bottom.

3. The assembly as described in claim 2, further comprising said seatback arm and said cam being sandwiched between a pair of inner and outer support plates, said seatback arm being rotatably about a main pivot, an interlock lever being rotatably secured to an exterior surface of said outer support plate and, along with said cam, being coaxially mounted to said release lever about a cam pivot.

4. The assembly as described in claim 3, said first latch mechanism further comprising a first pair of rear latch subassemblies arranged on opposite sides of the seat bottom and engageable with first and second rear supported strikers.

5. The assembly as described in claim 4, a first floor latch release linkage rotatably slaved to said cam pivot and, upon rotation of said release lever an initial degree, translating a cable operably communicating with a latch plate associated with a first selected rear latch subassembly and to disengage from a first rear supported striker.

6. The assembly as described in claim 5, said interlock lever further comprising a first angled projection engaged by said release lever upon initial rotation of the same, said interlock lever including a second angled projection abutting an interlock plate in turn rotatably mounted about said main pivot upon said exterior surface of said outer support plate, forward folding of the seat back causing said interlock plate to rotate out of abutting engagement with said interlock lever, permitting further rotation of said release lever to a succeeding degree, thereby permitting a second floor latch release linkage, secured to said interlock lever, to actuate translating a second cable operably communicating with a latch plate associated with a second rear latch subassembly, and to disengage from a second rear supported striker.

7. The assembly as described in claim 6, further comprising a bracket mounted to said outer support plate and securing first ends of said first and second translating cables.

8. The assembly as described in claim 1 said first latch mechanism further comprising a pair of support plates sandwiching said latch plate therebetween, an anti-chuck cam being rotatably secured to a further location between said support plates, a shoulder defined in said cam seating against a support surface of said latch plate.

9. The assembly as described in claim 8, said first latch mechanism further comprising a second cam rotatably secured to between said support plates, in coaxial fashion relative to said anti-chuck cam.

10. The assembly as described in claim 9, farther comprising a coil spring extending between said anti-chuck cam and a location of said latch plate offset from said rotatable securement to said support plate, said second cam being actuated to rotate in a direction away from said support surface, continued rotation causing said anti-chuck cam to rotate in unison and, upon said shoulder separating from said support surface, forward pivoting of the seat causing said latch plate to rotate relative to the striker, a specified degree of tension exerted on said spring causing said latch plate to farther rotate to a fully disengaged position.

11. The assembly as described in claim 9, said second cam exhibiting a secondary shoulder positioned proximate said primary support shoulder and said support surface.

12. The assembly as described in claim 9, said first latch mechanism farther comprising an anti-chuck clock spring influencing said anti-chuck cam in engaging fashion against said latch plate.

13. The assembly as described in claim 10, said first latch mechanism further comprising an arcuate slot defined in a selected one of said support plates, a pin inserting through said slot and securing to said latch plate, an end of said coil spring connecting to said pin.

14. The assembly as described in claim 12, said first latch mechanism further comprising a cable actuated lever secured in overlapping fashion relative to said cams and said clock spring, pivoting of said lever overcoming said clock spring bias and creating disengaging rotation of said anti-chuck and second cams.

15. The assembly as described in claim 8, further comprising a rivet for rotatably securing said latch plate between said support plates.

16. The assembly as described in claim 1, said second latch mechanism further comprising a second pair of forward latch subassemblies arranged on opposite sides of the seat bottom and engageable with at least one forward situated pair of supported strikers.

17. The assembly as described in claim 16, each of said second latch subassemblies exhibiting a specified shape and size and adapted to engage an individual pair of forward situated strikers.

18. The assembly as described in claim 17, said second latch mechanism further comprising a clock spring biasing a forward pivot point of the seat bottom in forward rotating fashion.

19. The assembly as described in claim 18, said second latch mechanism further comprising a pair of support plates sandwiching said arcuately configured latch therebetween, said lockout pin projecting from a configured edge of said arcuate latch in proximity to said spring actuated hook.

20. The assembly as described in claim 19, said second latch mechanism further comprising a pair of anti-chuck cams pivotally supported in abutting engagement with each of a selected pair of forward situated strikers corresponding to a selected side of the seat bottom.

21. The assembly as described in claim 20, a first of said anti-chuck cams associated with said second latch mechanism being arrayed in coplanar and abutting contact with an edge location associated with said arcuately configured latch plate, disengaging rotation of said latch plate relative said striker causing simultaneous disengaging rotation of said anti-chuck cam.

22. The assembly as described in claim 21, said linkage assembly further associated with said second latch mechanism further comprising a spring-driven linkage assembly for actuating said hook responsive to pivotal rotation of the seat frame.

23. The assembly as described in claim 22, said linkage assembly further comprising:
a first lever pivotally secured to an outer facing surface of a selected support plate;
an elongated link pivotally and translatably secured to a free end of said first lever;
a coil spring secured at a first end to a fixed location associated with the support plate, and at a second end to a location of said link pivotally connected to said first lever; and
a hook actuating lever pivotally and translatably secured at a first end to a second end of said elongated link, said hook engaging a midpoint location associated with said hook actuating lever.

24. The assembly as described in claim 23, further comprising said second of said anti-chuck cams being pivotally slaved to rotation of said first lever.

25. The assembly as described in claim 23, further comprising a cable extending from said release lever and engaging a second end of said hook actuating lever for releasing said seat frame in a fully forwardly rotated dump position.

26. The assembly as described in claim 19, each of said second latch subassemblies associated with said second latch mechanism further comprising at least one roller support located proximate a lower edge for facilitating rearward displacement of said seat relative to the vehicle.

27. The assembly as described in claim 26, further comprising a plurality of at least three roller supports associated with each of said second latch subassemblies.

28. The assembly as described in claim 23, said hook further comprising an angled detent portion engaged by said hook actuating lever upon actuation thereof and in order to reposition said hook in engaging fashion relative said lockout pin.

29. The assembly as described in claim 1, said second latch mechanism further comprising a clock spring for biasing said arcuately configured latch in a striker engaging fashion.

30. The assembly as described in claim 21, further comprising a biasing spring for influencing said first anti-chuck cam in a striker engaging fashion.

31. The assembly as described in claim 19, said second latch mechanism further comprising an intermediate support plate secured in interposing fashion between said pair of support plates, said intermediate plate exhibiting an angled upper surface facilitating mounting to the seat bottom frame.

32. The assembly as described in claim 1, the vehicle seat exhibiting a specified shape and size, said first latch mechanism further comprising a first pair of rear latch subassemblies, said second latch mechanism further comprising a second pair of forward latch subassemblies.

33. A rear row mounted and removable vehicle seat, comprising:
a seat back pivotally secured relative to a seat bottom,
a latch assembly releasably engaging die seat bottom to front and rear floor supported strikers to permit at least one of forward rotating seat dump and rearward seat removal;
said latch assembly further comprising a first pair of latch subassemblies mounted to selected rear locations of a seat bottom frame and each including a latch plate adapted to engage a corresponding rear striker;
a release lever secured to a further location of the seat frame and actuated a degree to permit the seat back to pivotally fold flat against the seat bottom, said release lever subsequently being actuated a second degree to disengage said latch plate from the rear located striker and to permit forward rotation of the seat about the front supported striker;

said latch assembly further comprising a second pair of latch subassemblies mounted to selected forward location of the seat bottom frame and each including an arcuately configured and pivotal latch adapted to engage a corresponding front striker; and said second latch mechanism further comprising a spring actuated and combination displaceable and pivotal hook which is movable in order to engage a lockout pin pivotally associated with said arcuately configured latch and upon a selected pivotal displacement of said seat frame relative the front floor supported striker, said hook influencing said lockout pin to in turn pivot said latch about a pivot point established with said second latch mechanism, the seat subsequently being rearwardly displaced to permit removal from the vehicle.

34. A latch assembly for use with a vehicle seat, the seat having a seat back pivotally secured to a seat bottom, the seat bottom being biasingly and rotationally supported along a forward transverse extending edge to a vehicle floor and releasably secured to a plurality of floor mounted strikers, said latch assembly comprising:

at least one first latch mechanism mounted to a rear location of a frame associated with the seat bottom and including a latch plate configured to engage a rear striker;

a release lever secured to said frame and operatively engaging a cam for releasing the seat back to fold flat against the seat bottom upon said release lever being actuated to an initial degree;

a cable extending from said release lever to said first latch mechanism, said release lever being actuated to a second degree to disengage said latch plate from the rear located striker and to permit forward rotation of the seat about the front supported striker;

a second latch mechanism mounted to a selected front location of die seat frame and including an arcuately configured latch pivotally secured to said second latch assembly and engaging a front striker; and said second latch mechanism further comprising a spring actuated hook which is manipulated by a linkage assembly for engaging a lockout pin in turn pivotally associated with said arcuately configured latch at a location offset from its pivotal connection to said second latch mechanism and such that, upon a selected pivotal displacement of said seat frame relative the front floor supported striker, said latch is pivoted out of contact with the front striker and the seat subsequently being rearxvardly displaced to permit removal from the vehicle.

35. The latch assembly as described in claim 34, further comprising a second cable extending from said release lever to said spring actuated hook, actuation of said second cable causing actuating said spring actuated hook to an intermediate lockout pin engaging position.

* * * * *

UNITED STATES PATENT AND TRADEMARK OFFICE
CERTIFICATE OF CORRECTION

PATENT NO.        : 7,434,862 B2                                          Page 1 of 1
APPLICATION NO. : 11/247638
DATED             : October 14, 2008
INVENTOR(S)       : Tavis Lutzka et al.

It is certified that error appears in the above-identified patent and that said Letters Patent is hereby corrected as shown below:

Column 12, line 3, after "configured" insert --and pivatal--

Column 12, line 5, replace "pivotable" with --pivatal--

Column 13, line 1, replace "farther" with --further--

Column 13, line 10, replace "farther" with --further--

Column 13, line 16, replace "farther" with --further--

Column 14, line 56, replace "die" with --the--

Column 16, line 11, replace "die" with --the--

Column 16, line 22, replace "rearxvardly" with --rearwardly--

Signed and Sealed this

Twenty-fourth Day of February, 2009

JOHN DOLL
*Acting Director of the United States Patent and Trademark Office*